United States Patent
Mao

(10) Patent No.: US 7,590,134 B2
(45) Date of Patent: Sep. 15, 2009

(54) SYSTEM FOR TRANSMITTING ASYNCHRONOUS DATA PACKETS

(75) Inventor: Jean-Pierre Mao, Pibrac (FR)

(73) Assignee: Airbus France S.A.S., Toulouse (FR)

( * ) Notice: Subject to any disclaimer, the term of this patent is extended or adjusted under 35 U.S.C. 154(b) by 917 days.

(21) Appl. No.: 10/717,457

(22) Filed: Nov. 21, 2003

(65) Prior Publication Data

US 2004/0208179 A1 Oct. 21, 2004

Related U.S. Application Data

(62) Division of application No. 09/988,527, filed on Nov. 20, 2001.

(30) Foreign Application Priority Data

Dec. 12, 2000 (FR) .................... 00 16146

(51) Int. Cl.
*H04L 12/56* (2006.01)
*G08B 21/00* (2006.01)
*H04J 3/00* (2006.01)

(52) U.S. Cl. .................... 370/412; 370/473; 370/476; 340/945

(58) Field of Classification Search ............... None
See application file for complete search history.

(56) References Cited

U.S. PATENT DOCUMENTS

| | | | |
|---|---|---|---|
| 5,303,302 A | 4/1994 | Burrows | |
| 5,544,336 A * | 8/1996 | Kato et al. | 710/316 |
| 5,615,214 A | 3/1997 | Chandos et al. | |
| 5,732,082 A | 3/1998 | Wartski et al. | |
| 6,014,381 A | 1/2000 | Troxel et al. | |
| 6,430,184 B1 | 8/2002 | Robins et al. | |
| 6,577,640 B2 | 6/2003 | Mansouri et al. | |
| 6,611,519 B1 | 8/2003 | Howe | |
| 6,735,219 B1 | 5/2004 | Clauberg | |
| 6,804,240 B1 | 10/2004 | Shirakawa et al. | |
| 6,879,634 B1 | 4/2005 | Oz et al. | |
| 6,948,108 B1 | 9/2005 | Ludwig et al. | |
| 7,020,149 B1 * | 3/2006 | Hellwig et al. | 370/412 |
| 7,027,442 B2 | 4/2006 | Shirakawa et al. | |
| 7,031,343 B1 | 4/2006 | Kuo et al. | |
| 7,181,298 B1 | 2/2007 | Yoshio et al. | |
| 2001/0043614 A1 | 11/2001 | Viswanadham et al. | |
| 2002/0018474 A1 | 2/2002 | Assa et al. | |
| 2002/0083345 A1 * | 6/2002 | Halliday et al. | 713/201 |
| 2002/0105958 A1 | 8/2002 | Mao | |
| 2003/0118016 A1 | 6/2003 | Kalkunte et al. | |
| 2005/0207419 A1 | 9/2005 | Kohzuki et al. | |
| 2005/0220110 A1 | 10/2005 | Agarwal | |
| 2008/0144617 A1 * | 6/2008 | Molsberry et al. | 370/389 |

OTHER PUBLICATIONS

U.S. Appl. No. 09/988,527, filed Nov. 20, 2001, Mao.
U.S. Appl. No. 10/716,462, filed Nov. 20, 2003, Mao.

* cited by examiner

*Primary Examiner*—Gregory B Sefcheck
(74) *Attorney, Agent, or Firm*—Oblon, Spivak, McClelland, Maier & Neustadt, P.C.

(57) ABSTRACT

A system for processing asynchronous data includes a plurality of packeting modules configured to packet asynchronous data; and a message composition module connected to the plurality of packeting modules. The message composition module is configured to send a request for a packet to a packeting module of the plurality of packeting modules. The packeting module is configured to stop packeting asynchronous data in response to the request and to send to the message composition module a packet of asynchronous data formed prior to receiving the request.

23 Claims, 3 Drawing Sheets

SYSTEM FOR TRANSMITTING ASYNCHRONOUS DATA PACKETS

CROSS-REFERENCE TO RELATED APPLICATIONS

This application is a divisional application of published U.S. application Ser. No. 09/988,527, filed Nov. 20, 2001, which claims priority under 35 U.S.C. § 119 to French Patent Application 00 16146, filed on Dec. 12, 2000, the entire disclosure of both of which are incorporated herein by reference.

BACKGROUND OF THE INVENTION

1. Field of the Invention

The present invention concerns a process and device for deterministic transmission of asynchronous data in packets.

2. Discussion of the Background

In devices of the prior art for deterministic transmission of asynchronous data in packets, the acquisition device and data acquired by this device are asynchronous. Data packeting is made according to an inherent sequencing. A packet corresponds to one or several acquired data processed with or without wrapping, the wrapping being made up of a heading and an end. The number of data transmitted in the output message corresponding to a packet is defined according to two criteria:

the number of data is restricted:
it is always the same, or
the maximum is specified
the distribution of data is positioned temporally in an equally-timed manner or not.

In the first example of data transmission from a packet i in the output message, as illustrated in FIG. 1, the number of data Mi is always the same, and distributed in an equally-timed manner (Ti equal delays).

In the second example of data transmission from a packet i in the output message, as illustrated in FIG. 2, the maximum number of data Mi is always the same, it is MxTxi over an identified period of time Txi, and distributed unequally-timed (Txi variable delays)—MxTxi varies at each Txi, with MxTxi≦Mi.

In the field of data acquisition and telemetry of flight testing installations, the numerical or digital data, conveyed on continuous and cyclic messages, issued by acquisition and processing systems of the prior art is stored in the FIFO (First in-First out) batteries as and when it arrives. The data arrives in a totally asynchronous manner.

A module for packeting facilitates placing certain data from these FIFO batteries according to a predefined order. It also facilitates enhancing this data with elements of the relative date calculation type, data identification, and formatting of data, etc. A packet thus obtained is therefore a group of data with a precise format and containing data in a precise order.

A module for packeting operates according to the following succession of stages:
1) reception of data contained in the FIFO batteries (dump),
2) start of packeting,
3) packeting, with sorting and data enhancement,
4) end of packeting,
5) sending of the packet to a message composition module.

This message composition module recovers, one after the other, the packets created by the packeting modules. A message is then made up of successive packets in a predefined order.

A formatting module then facilitates setting the message in electrical format in the protocol used for the transmission.

The operating cycle of the packeting module is self-sustaining. When the message composition module needs a packet, it sends a request to the packeting module which transmits the packet if it is made up, i.e. if stage 4 is finished. If not, it sends nothing or else an empty packet so as not to block the message composition module. The data is transmitted via the various stages 1 to 5—the data arrives, it is put into packets by a self-sustaining device which has its own life, as it is only transferred in the message if the packet is ready. The message can contain no data, solely because the packeting has not been finished.

In these devices of the prior art, the data conveyed on the messages is at fixed slots in time. They are PCM (Pulse Coded Modulation) type messages which meet the IRIG106 standard. The formalism of packeting, as a packet can be made up of one datum, is standardized. On the other hand, this standard stipulates nothing on the transmission time of the packets. It is the same for the CE83 and CCSDS standards.

As illustrated in FIG. 3, the data and transmission in the output message are asynchronous, the transmission time TT therefore varies between the time of packeting TP and a duration 2*TP equal to twice this time, as the transmission time in the output message TMS is such that TMS<<TP.

SUMMARY OF THE INVENTION

The aim of the invention is to mitigate the disadvantages of devices of the prior art, by enabling:
transmission of the maximum amount of data in the output message,
controlling transmission time of the acquired data,
having the greatest possible ratio for the number of acquired/wrapped data in the packet.

The invention concerns a process of deterministic transmission of asychronous data in packets, in which data arriving asynchonously is stored in batteries as and when it arrives. The process can include the following stages:
reception of data contained in a set of batteries in one of several packeting modules, start of packeting, packeting with sorting and enhancement of data, end of packeting and sending of the packet made up,
stoppage of the packet make-up in the course of realization in a packeting module when a message composition module needs this packet, transmission of the packet thus made up, start of the realization cycle of a new packet,
recovery, one after another, of packets thus created in a predefined order in the message composition module,
setting the message, compiled in the message composition module, in the electrical format in the protocol used for the transmission.

In this process, a packeting module which is no longer self-sustained is used.

In this process, as soon as the message composition module requests a packet, it receives the latter for it is this module that controls the packeting cycle.

Contrary to devices of the prior art in which the messages are only compiled with "well finished" packets (with the risk of having empty packets), in the process of the invention each message carries packets perhaps "less well finished" but all the data which can be, is transmitted as soon as transmission is requested. The timing cycle of datum between input and output of a device implementing this process is therefore controlled.

The invention also concerns a device of deterministic transmission of asynchronous data in packets including:
- at the least one input module receiving the input data,
- batteries receiving numerical data stemming from this input module,
- several packeting modules each connected to at least one battery,
- at the least one control module for battery dump monitored by at least one packeting module,
- a message composition module receiving the outputs of all the packeting modules, which can send an order of end of packet make-up to each one,
- a module for formatting packets,
- an output module capable of issuing each made-up packet on a transmission line.

The process and the device of the invention can be used notably in data acquisition and real-time processing systems for test installations for new aeroplanes. The solution proposed in the invention for such systems offers the following advantages. To follow vibration (or flutter) tests which are very dangerous for a plane, it is essential to perfectly control the transmission time TT, as the useful acquired data must be given to a specialist with a delay TT either less than 100 ms, or parameterized depending on the type of test. With the solution stipulated in the invention TT=TP, while in the devices of prior art TP<TT≅2*TP on the assumption that TMS<<TP. The objectives are therefore optimized with the solution of the invention. In fact, at fixed TT, TP is greater with the recommended solution than with the solution of devices of the prior art.

DESCRIPTION OF THE PREFERRED EMBODIMENTS

The process of deterministic transmission of asynchronous data in packets of the invention in which data arriving asynchronously is stored in FIFO batteries as and when it arrives, includes the following stages:
- reception of data contained in the batteries,
- start of packeting,
- packeting with sorting and enhancement of data,
- end of packeting,
- sending of the packet to a message composition module which recovers the packets created one after another, in a predefined order,
- and, when this message composition module needs a packet:
  - stoppage of make-up of the packet in the course of realization,
  - transmission of the packet thus made up,
  - start of the realization cycle of a new packet.

Figure 1:
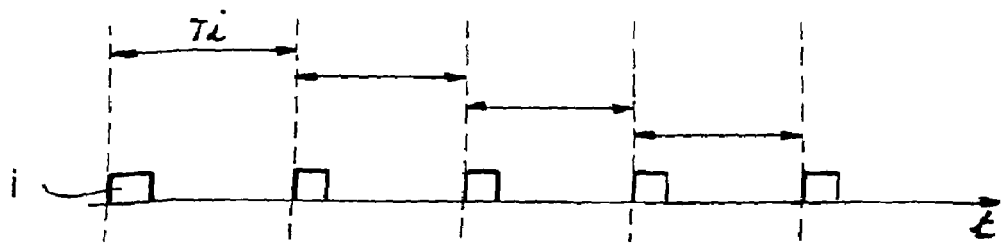
FIGS. 1 and 2 illustrate two examples of transmission of data from a packet, in a device of the prior art.
Figure 2:
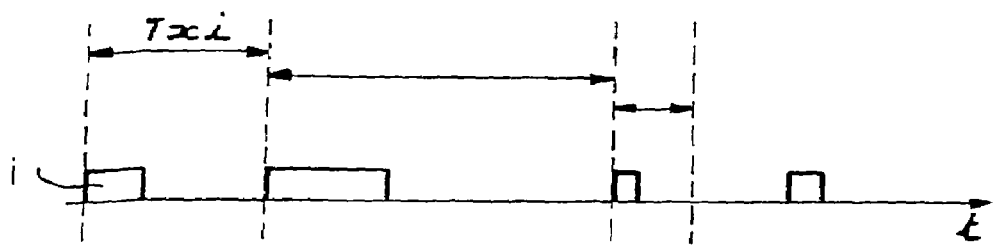
Figure 3:
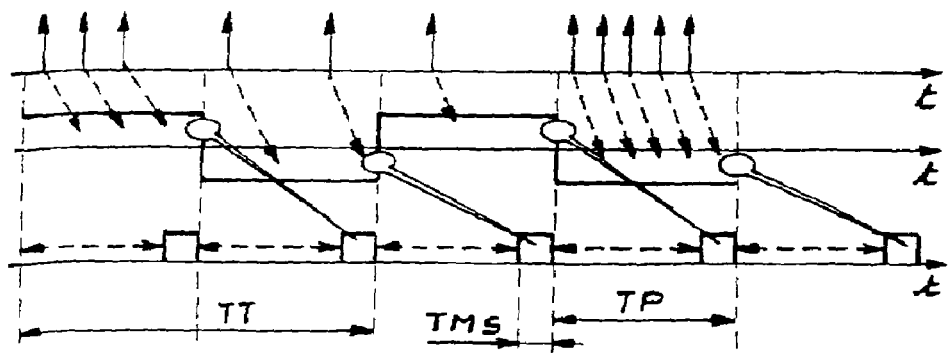
FIG. 3 illustrates an example of operation of a device of the prior art.
Figure 4:
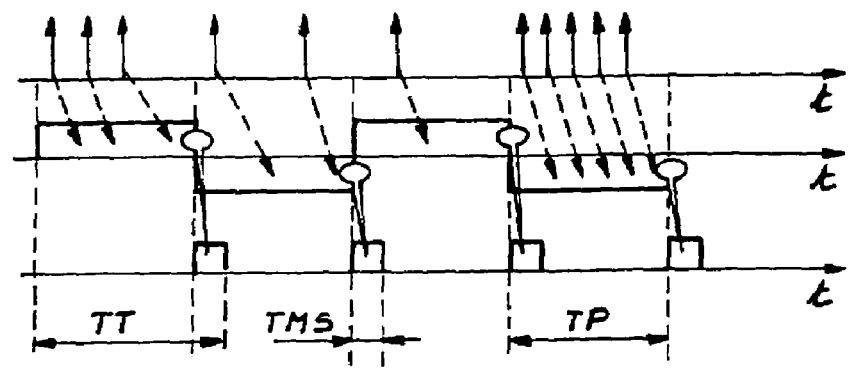
FIG. 4 illustrates the operation of the process of the invention.

As illustrated in FIG. 4, the process of the invention consists in synchronizing the start and end of packet make-up in relation to their transmission in the output message—TMS being the transmission time in the output message, TP the packeting time and TT the transmission time with TT=TP+TMS. The solution obtained with TP>>TMS advantageously meets the previously specified objectives.

For an identified packet, the packeting limits the number of acquired data to a figure x. If during the time TP, there are x+m data to be packeted, m data is then lost.

Figure 5:
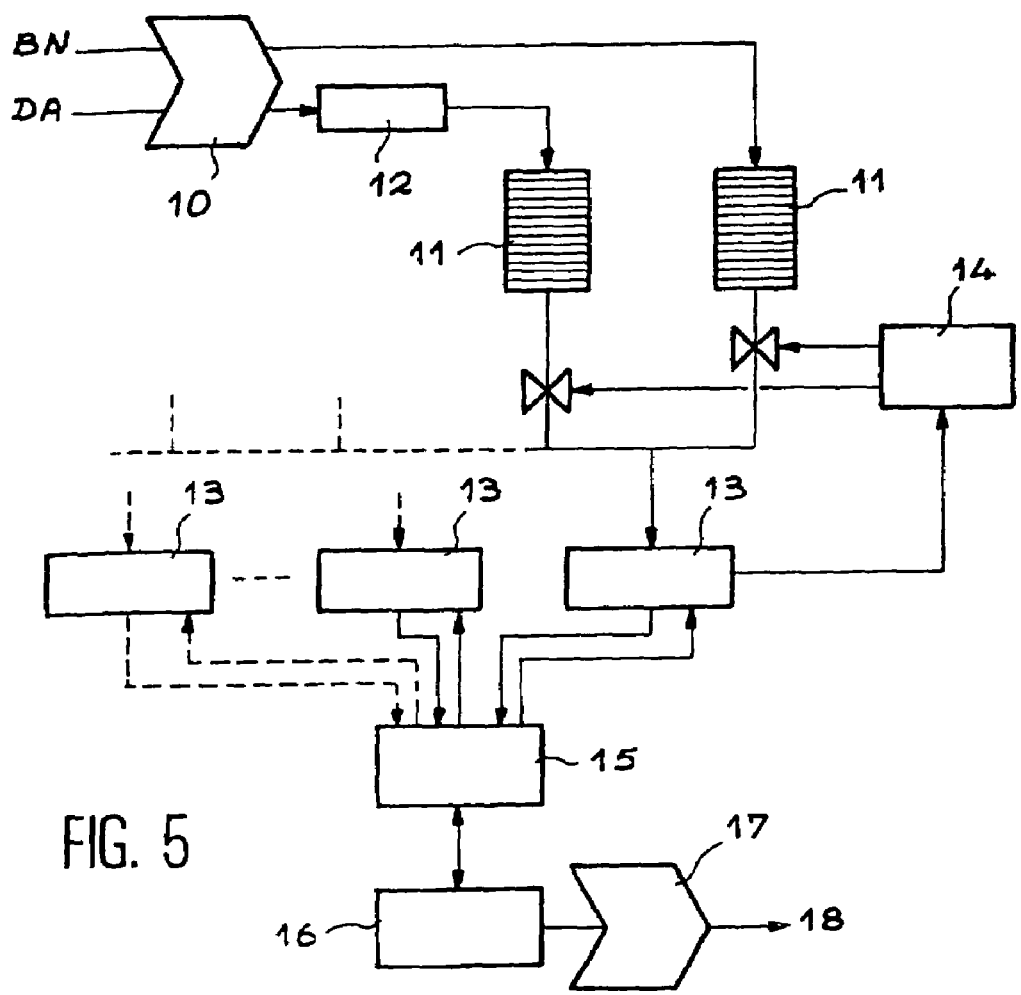
FIG. 5 illustrates the device of the invention.

The device of the invention, illustrated in FIG. 5, includes:
- at the least, one input module 10 receiving input data, for example a digital bus BN and analog data DA,
- at the least a set of batteries 11 receiving digital data coming from this input module, possibly through an analog/digital converter 12, connected to at least one packeting module 13,
- at the least one control module for battery dump 14 monitored by at least one packeting module 13,
- a message composition module 15 receiving the outputs of all the packeting modules 13, which can send an order of end of packet make-up to each one,
- a module for formatting packets 16,
- an output module 17 capable of issuing each made-up packet on a transmission line 18.

In the device of the invention, the digital or digitized data is stored in the FIFO batteries 11 as and when it arrives. The data arrives in a totally asynchronous manner—seen from the device its arrival is random.

The role of each packeting module 13 is to place certain data from the batteries 11 according to a predefined order. It can also enhance this data with elements of the relative date calculation type, data identification and formatting of the data. A packet is therefore a group of data with a precise format and containing data in a precise order.

As described previously, each packeting module 13 operates according to the following cycle:
1) reception of the data contained in the batteries,
2) start of the packeting,
3) packeting with sorting and enhancement of the data,
4) end of the packeting,
5) sending of the packet to the message composition module.

What differentiates the device of the invention from devices of the prior art is the way in which each task 1 to 5 is triggered.

The message composition module 15 recovers the packets created by the successive packeting modules 13 one after the other in a predefined order.

The operating cycle of this module 13 is not self-sustaining. When the message composition module 15 needs a packet, it sends the request. This stops make-up of the packet in the course of realization. It transmits the packet thus made up then starts the realization cycle of a new packet.

The formatting module 16 is responsible for setting the message 15 in electrical format in the protocol used for the transmission (recognised function and realization).

Figure 6:
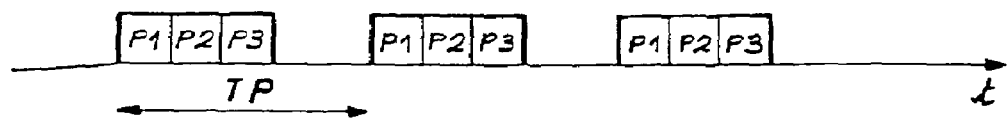
FIG. 6 illustrates an example of operation of the device of the invention illustrated in FIG. 5.

In an example of operation, the device of the invention includes three packeting modules 13. The make-up of packets that they generate (P1, P2 and P3 respectively) is unimportant (data sorting, enhancing, etc.). As illustrated in FIG. 6, a message is made up of the succession of three packets—P1 followed by P2 followed by P3—which are transmitted by the message composition module 15 to the formatting module 16, TP being the packeting time. In this example wrapping elements are not taken into consideration (start of frame, end of frame, checksum, etc.) realized by the formatting module 16.

Figure 7:
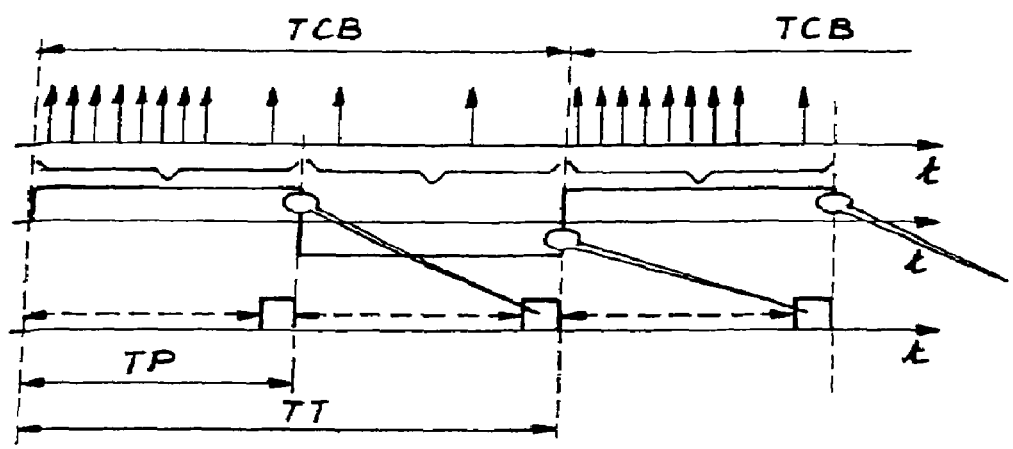
FIGS. 7 and 8 illustrate an example of realization for an acquisition of arinc429 bus using respectively a device of the prior art and the device of the invention.
Figure 8:
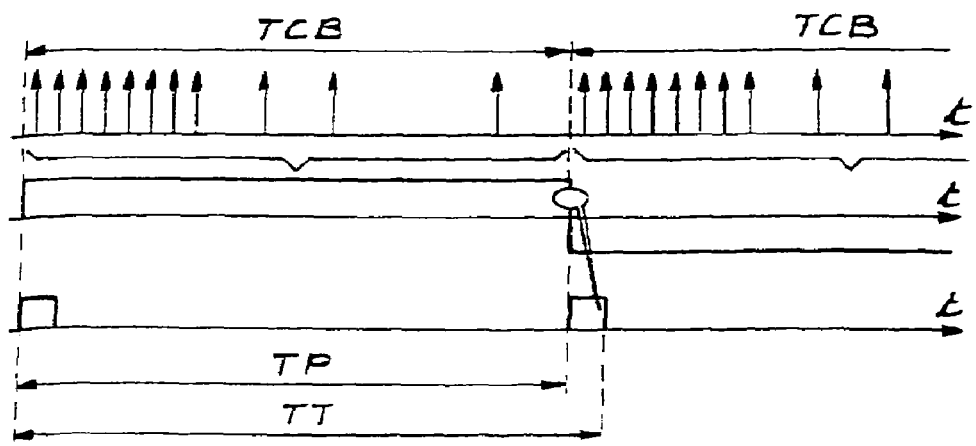

At present an example of realization will be considered which is an acquisition of arinc429 bus on the assumption that TMS<<TP, TCB being the bus cycle time, the number of data always being the same, and distributed in an equally-timed manner: FIG. 7 illustrates operation of a device of the prior art, FIG. 8 illustrates operation of the device of the invention as described above.

The advantages of the solution proposed by the invention as compared with devices of the prior art are shown in Table 1 at the end of the description. The device of the invention meets the objectives defined previously and reveals a very significant gain as compared with the devices of the prior art.

TABLE 1

| Output message for the time window TT | Device of the prior art | Device of the invention | Device of the prior art-Device of the invention/ Device of the invention => gain |
|---|---|---|---|
| Number of data | 18 | 11 | 64% |
| Number of wrappings | 2 | 1 | 100% |

What is claimed is:

1. A system for processing asynchronous aircraft-related data, comprising:
   a plurality of packeting modules configured to packet asynchronous data including information for aircraft-related data operations; and
   a message composition module connected to said plurality of packeting modules,
   wherein said message composition module is configured to compose a message and send a request for a packet directly to at least one packeting module of said plurality of packeting modules when said message composition module needs a packet, and
   wherein said at least one packeting module is configured to stop packeting asynchronous data, even if packeting of the asynchronous data is not completed, in response to said request and to send to said message composition module a packet of asynchronous data formed prior to receiving said request.

2. The system of claim 1, wherein said message composition module is configured to send said request to each of said plurality of packeting modules, and wherein each packeting module of said plurality is configured to stop packeting asynchronous data in response to said request and to send to said message composition module a packet of asynchronous data formed prior to receiving said request.

3. The system of claim 2, further comprising a battery connected to said plurality of packeting modules, said at least one battery being configured to store said asynchronous data.

4. The system of claim 2, wherein said message composition module is configured to receive a plurality of packets from said plurality of packeting modules.

5. The system of claim 4, wherein said message composition module is configured to receive said plurality of packets one after another in a predetermined order.

6. The system of claim 4, wherein said message composition module is configured to compose a message comprising said plurality of packets.

7. The system of claim 6, further comprising a formatting module connected to said message composition module and configured to format said message.

8. The system of claim 7, further comprising an output module configured to transmit said message on a transmission line.

9. The system of claim 1, wherein the message composition module recovers packets of asynchronous data created by the plurality of packeting modules one after the other in a predefined order.

10. The system of claim 1, wherein said message includes a number of data in said packet of asynchronous data equal to or less than 11, and said message includes one wrapping.

11. The system of claim 1, wherein said packeting module is further configured to sort and enhance data.

12. The system of claim 1, wherein the message composition module needs said packet after the message composition module has transmitted a previous data packet and the message composition module is ready to start packeting asynchronous data again.

13. A system for transmitting asynchronous aircraft-related data packets, comprising:
    means for packeting asynchronous data including information for aircraft-related data operations in a packeting module;
    means for receiving a request, in the packeting module, directly from a message composition module when said message composition module needs a data packet;
    means for interrupting said means for packeting in response to said request;
    means for transmitting a plurality of packets, even if packeting of asynchronous data is not completed, each packet of said plurality being formed by said means for packeting prior to an interruption by said means for interrupting; and
    means for composing a message comprising said plurality of packets.

14. The system of claim 13, further comprising means for formatting said message into a formatted message.

15. The system of claim 14, further comprising means for transmitting said formatted message.

16. The system of claim 15, wherein said packeting of said asynchronous data is performed during a packeting time, said packeting time being greater than half of a total time for packeting said asynchronous data and for transmitting said message.

17. The system of claim 16, wherein said total time duration is less than 100 ms, said packeting time duration is approximately equal to said total time duration, and a time for transmitting said message is negligible compared to said packeting time duration.

18. The system of claim 17, wherein said packeting time is equal to a cycle time for a transmission line over which said formatted message is transmitted.

19. The system of claim 13, wherein said means for transmitting said plurality of packets transmits said data packet as soon as the message composition module requests said data packet.

20. The system of claim 13, wherein said means for interrupting interrupts said packeting as soon as the packeting module receives the request from the message composition module, and the means for transmitting transmits an incomplete data packet, being composed at a time of said interrupting, to the message composition module after said packeting is interrupted, and further comprising means for starting a next packeting operation composing a next data packet as soon as the incomplete packet is transmitted.

21. A system for transmitting a packet of asynchronous aircraft-related data, comprising:
   means for packeting said asynchronous data including information for aircraft-related data operations into a packet during a packeting time;
   means for requesting said packet directly from said means for packeting when a message composition module needs said packet;
   means for stopping said means for packeting in response to a request from said means for requesting;
   means for composing a message comprising said packet; and
   means for transmitting said message during a message transmitting time, even if packeting of said asynchronous data is not completed,
   wherein said packeting time is greater than said message transmitting time.

22. The system of claim 21, further comprising a transmission line over which said message is transmitted by said means for transmitting, said transmission line having a cycle time, and wherein said means for requesting requests said packet so that said packeting time is equal to said cycle time.

23. The system of claim 22, wherein a total time for packeting said asynchronous data and transmitting said data is less than 100 ms and said message transmitting time is so short compared to said packeting time that said total time is approximately equal to said packeting time.

* * * * *